(12) United States Patent
Aina et al.

(10) Patent No.: US 10,345,962 B2
(45) Date of Patent: Jul. 9, 2019

(54) TOUCH PANEL WITH NON-UNIFORM TOUCH NODE LAYOUT

(71) Applicant: Apple Inc., Cupertino, CA (US)

(72) Inventors: Morakinyo J. Aina, San Jose, CA (US); Amit Nayyar, San Jose, CA (US); Sean E. O'Connor, Palo Alto, CA (US); Peter Csaszar, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 601 days.

(21) Appl. No.: 14/848,249

(22) Filed: Sep. 8, 2015

(65) Prior Publication Data

US 2016/0216838 A1    Jul. 28, 2016

Related U.S. Application Data

(60) Provisional application No. 62/106,957, filed on Jan. 23, 2015.

(51) Int. Cl.
   *G06F 3/041*    (2006.01)
   *G06F 3/044*    (2006.01)

(52) U.S. Cl.
   CPC ............ *G06F 3/0418* (2013.01); *G06F 3/044* (2013.01); *G06F 3/0416* (2013.01)

(58) Field of Classification Search
   CPC ....... G06F 3/0418; G06F 3/044; G06F 3/0416
   See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Amare Mengistu
*Assistant Examiner* — Jennifer L Zubajlo
(74) *Attorney, Agent, or Firm* — Kubota & Basol LLP

(57) ABSTRACT

This relates to a touch sensor panel including: a substrate having a first surface and a second surface; a first touch node formed by a first drive line and a first section of a first sense line both routed on the first surface of the substrate; and a second touch node formed by a second drive line routed on the first surface of the substrate and a second section of the first sense line routed on the second surface of the substrate.

8 Claims, 6 Drawing Sheets

(56) References Cited

U.S. PATENT DOCUMENTS

| | | |
|---|---|---|
| 8,479,122 B2 | 7/2013 | Hotelling et al. |
| 9,128,560 B2 * | 9/2015 | Ng .......................... G06F 3/044 |
| 2006/0197753 A1 | 9/2006 | Hotelling |
| 2011/0316567 A1 * | 12/2011 | Chai ...................... G06F 3/044 |
| | | 324/686 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

RAW IMAGE

| 496 | 490 | 482 | 436 | 439 | 467 | 417 |
|-----|-----|-----|-----|-----|-----|-----|
| 435 | 496 | 425 | 484 | 457 | 447 | 461 |
| 459 | 455 | 493 | 459 | 408 | 402 | 427 |
| 423 | 414 | 435 | 455 | 406 | 434 | 466 |
| 476 | 416 | 420 | 492 | 454 | 417 | 469 |
| 426 | 426 | 426 | 429 | 478 | 480 | 475 |
| 451 | 485 | 462 | 476 | 494 | 432 | 446 |
| 470 | 426 | 448 | 476 | 413 | 453 | 409 |

FINAL IMAGE

| 600 | 600 | 600 | 600 | 600 | 600 | 600 |
|-----|-----|-----|-----|-----|-----|-----|
| 600 | 600 | 600 | 600 | 600 | 600 | 600 |
| 600 | 600 | 600 | 600 | 600 | 600 | 600 |
| 600 | 600 | 600 | 600 | 600 | 600 | 600 |
| 600 | 600 | 600 | 600 | 600 | 600 | 600 |
| 600 | 600 | 600 | 600 | 600 | 600 | 600 |
| 600 | 600 | 600 | 600 | 600 | 600 | 600 |
| 600 | 600 | 600 | 600 | 600 | 600 | 600 |

TOUCH PANEL WITH NON-UNIFORM TOUCH NODE LAYOUT

CROSS REFERENCE TO RELATED APPLICATIONS

This application claims the benefit under 35 U.S.C. § 119(e) of U.S. Provisional Patent Application No. 62/106,957, filed Jan. 23, 2015, the content of which is incorporated by reference herein in its entirety for all purposes.

FIELD

This relates generally to touch panel technology, and more particularly, to a touch sensor panel with non-uniform touch node layout and methods of determining correction gains for the touch nodes of the touch sensor panel.

BACKGROUND

Many types of input devices are presently available for performing operations in a computing system, such as buttons or keys, mice, trackballs, joysticks, touch sensing panels, and the like. Touch sensing panels, in particular, are becoming increasingly popular because of their ease and versatility of operation as well as their declining price. A touch sensor panel can be a panel with a touch-sensitive surface. The touch sensor panel can be positioned in front of a display screen so that the touch-sensitive surface covers the viewable area of the display screen. Alternatively, the touch sensor panel can be a standalone input device such as a touch pad on a laptop. Touch sensor panels can allow a user to make various touch or hovering inputs via one or more touch objects such as fingers or styli. In general, the touch sensor panel can recognize the touch and position of one or more touches thereon, and the computing system can interpret the touch and thereafter perform an action based on the touch event.

A typical touch sensor panel typically includes a number of touch nodes. For example, in a capacitive touch sensor panel, each touch node can be formed by a capacitive coupling between a drive line and a sense line. A touch image can be captured from the touch sensor panel based on the capacitive readings from the touch nodes of the panel. The touch image can reflect, for example, the locations of one or more touches on the touch sensor panel.

One type of touch sensor panels can be implemented as an array of nodes formed by multiple drive lines crossing over multiple sense lines, where the drive and sense lines are separated by a dielectric material. This type of touch sensor panels is referred to as Double-layer Indium Tin Oxide (DITO) touch sensor panel. An example of such a touch sensor panel is described in, for example, Applicant's U.S. Pat. No. 8,026,903 entitled "Double-Sided Touch Sensitive Panel and Flex Circuit Bonding," issued on Sep. 27, 2011, the content of which is incorporated by reference herein. It should be understood that, as referred to in this document, a DITO touch sensor panel can use material other than ITO.

Another type of touch sensor panels can have co-planar single-layer touch sensors fabricated on a single side of a substrate. That is, the drive lines and sense lines forming the touch nodes can be formed on the same surface of a substrate. This type of touch sensor panels is referred to as Single-layer Indium Tin Oxide (SITO) touch sensor panel. An example of an SITO touch sensor panel is described in, for example, Applicant's U.S. Pat. No. 8,633,915 entitled "Single-Layer Touch-Sensitive Display," issued on Jan. 21, 2014, the content of which is incorporated by reference herein. It should be understood that, as referred to in this document, a SITO touch sensor panel can use material other than ITO.

Touch sensor panels can be found in various electronic devices such as smartphones, tablets, and wearable devices and ideally need to be designed to conform to the various form factors of these devices while providing consistent touch sensitivity across the panel.

SUMMARY

In one aspect, this disclosure generally relates to a touch sensor panel with non-uniform touch node layout designed to accommodate other components (e.g., surface-mounted (SMT) components) in the device. For example, an SMT component mounted in the center of the top surface of the touch sensor panel can prevent drive lines and sense lines of the touch sensor panel from being routed through the same area, which can potentially create a dead zone (i.e., an area with no touch sensitivity) on the touch sensor panel. In some examples, one or more drive lines and sense lines of an SITO touch sensor panel can be routed in a DITO pattern (e.g., routed on both sides of a DITO substrate) around the area occupied by the SMT component (or any other components) to recover, to some extent, the lost capacitive touch signal from the area occupied by the SMT component. For example, drive lines can be routed around an SMT component on a first side of a DITO substrate, and sense lines can be routed on an opposite side of the DITO substrate. The area occupied by the SMT component can also be referred to as an absent touch node in this document.

A second aspect of the disclosure relates to methods of estimating a touch signal value for an absent touch node of the touch sensor panel. Even though a touch signal from the DITO pattern adjacent to the absent touch node can be detected and substitute as the touch signal from the absent touch node, this detected signal can be significantly weaker, and as a result have a worse (e.g., 50% less) SNR than the signals from the rest of the touch nodes due to the difference between a DITO and a SITO layout. Accordingly, the touch signal from the DITO pattern can be supplemented with other touch signal information in order to estimate the touch signal value associated with the absent touch node. In some examples, the touch signal value associated with the absent touch node can be estimated based on touch signal values of the adjacent touch nodes.

Another aspect of the disclosure relates to methods of determining correction gains for the various nodes of a touch sensor panel (with either uniform or non-uniform touch node layout) to ensure uniform sensitivity over various regions (or touch nodes) of the panel. Manufacturing tolerances and routing can create non-uniformity in touch sensitivity over various regions of the touch sensor panel. In one example, correction gains can be calculated for the different regions (e.g., edges, corners) of the panel. In other examples where the touch sensor panel has certain unique form factors (e.g., rounded corners, absent touch nodes), a correction gain can be calculated for each touch node (rather than a region with multiple nodes) of the panel to achieve uniform touch sensitivity on the touch sensor panel. The individual correction gain for a touch node can be calculated based on data in a raw touch image captured from the touch panel and a predetermined final touch image with a universal touch signal value for all touch nodes of the touch panel which can facilitate uniform touch sensitivity on the panel.

DETAILED DESCRIPTION

Figure 1:
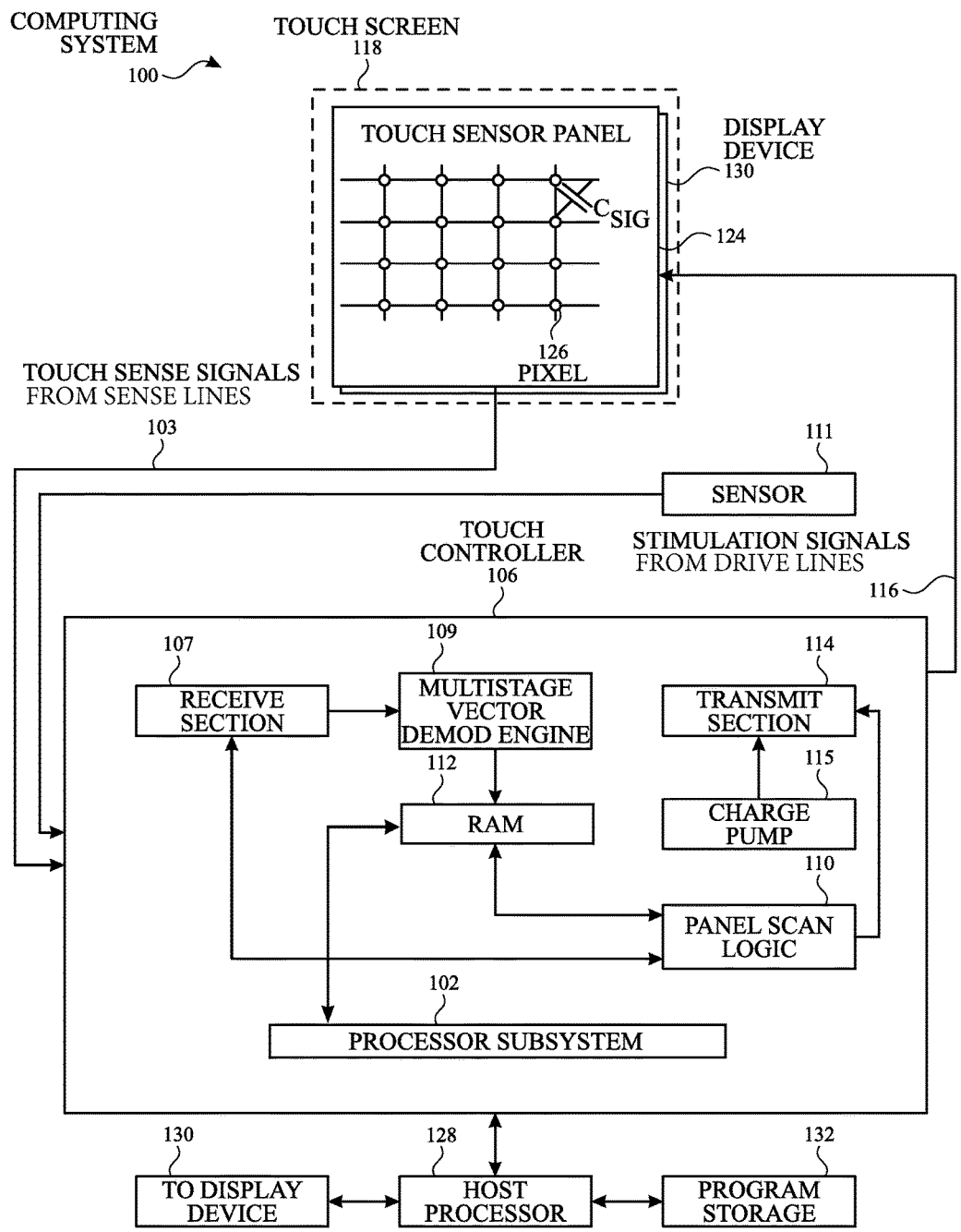
FIG. 1 illustrates an exemplary computing system, according to an example of the disclosure.

In the following description of examples, reference is made to the accompanying drawings in which it is shown by way of illustration specific examples that can be practiced. It is to be understood that other examples can be used and structural changes can be made without departing from the scope of the various examples.

In one aspect, this disclosure generally relates to a touch sensor panel with non-uniform touch node layout designed to accommodate other components (e.g., surface-mounted (SMT) components) in the device. For example, an SMT component mounted in the center of the top surface of the touch sensor panel can prevent drive lines and sense lines of the touch sensor panel from being routed through the same area, which can potentially create a dead zone (i.e., an area with no touch sensitivity) on the touch sensor panel.

In some examples, one or more drive lines and sense lines of an SITO touch sensor panel can be routed in a DITO pattern (e.g., routed on both sides of a DITO substrate) around the area occupied by the SMT component (or any other components) to recover, to some extent, the lost capacitive touch signal from the area occupied by the SMT component. For example, drive lines can be routed around an SMT component on a first side of a DITO substrate, and sense lines can be routed on an opposite side of the DITO substrate. The area occupied by the SMT component can also be referred to as an absent touch node in this document.

A second aspect of the disclosure relates to methods of estimating a touch signal value for an absent touch node of the touch sensor panel. Even though a touch signal from the DITO pattern adjacent to the absent touch node can be detected and substitute as the touch signal from the absent touch node, this detected signal can be significantly weaker, and as a result have a worse (e.g., 50% less) signal-to-noise ratio (SNR) than the signals from the rest of the touch nodes due to the difference between a DITO and a SITO layout. Accordingly, the touch signal from the DITO pattern can be supplemented with other touch signal information in order to estimate the touch signal value associated with the absent touch node. In some examples, the touch signal value associated with the absent touch node can be estimated based on touch signal values of the adjacent touch nodes.

Another aspect of the disclosure relates to methods of determining correction gains for the various nodes of a touch sensor panel (with either uniform or non-uniform touch node layout) to ensure uniform sensitivity over various regions (or touch nodes) of the panel. Manufacturing tolerances and routing can create non-uniformity in touch sensitivity over various regions of the touch sensor panel. In one example, correction gains can be calculated for the different regions (e.g., edges, corners) of the panel. In other examples where the touch sensor panel has certain unique form factors (e.g., rounded corners, absent touch nodes), a correction gain can be calculated for each touch node (rather than a region with multiple nodes) of the panel to achieve uniform touch sensitivity on the touch sensor panel. The individual correction gain for a touch node can be calculated based on data in a raw touch image captured from the touch panel and a predetermined final touch image with a universal touch signal value for all touch nodes of the touch panel which can facilitate uniform touch sensitivity on the panel.

Another aspect of the disclosure relates to preventing phantom touches due to cross-couplings between sense lines and routing traces connecting the drive lines to the drive controller. In some examples, this can be achieved by having the routing traces routed on a different layer (e.g., the bottom layer) of the touch sensor panel so that they can be shielded by a ground plane from being capacitively coupled to the sense lines. In some examples, a low-impedance net or mesh can be used in place of a ground plane.

FIG. 1 illustrates example computing system 100 that can utilize multi-touch controller 106 with integrated drive system according to various examples. Touch controller 106 can be a single application specific integrated circuit (ASIC) that can include one or more processor subsystems 102, which can include, for example, one or more main processors, such as ARM968 processors or other processors with similar functionality and capabilities. However, in other examples, the processor functionality can be implemented instead by dedicated logic, such as a state machine. Processor subsystems 102 can also include, for example, peripherals (not shown) such as random access memory (RAM) or other types of memory or storage, watchdog timers and the like. Touch controller 106 can also include, for example, receive section 107 for receiving signals, such as touch sense signals 103 from the sense lines of touch sensor panel 124, other signals from other sensors such as sensor 111, etc. Touch controller 106 can also include, for example, a demodulation section such as multistage vector demod engine 109, panel scan logic 110, and a drive system including, for example, transmit section 114. Panel scan logic 110 can access RAM 112, autonomously read data from the sense channels and provide control for the sense channels. In addition, panel scan logic 110 can control transmit section 114 to generate stimulation signals 116 at various frequencies and phases that can be selectively applied to the drive lines of touch sensor panel 124.

Charge pump 115 can be used to generate the supply voltage for the transmit section. Stimulation signals 116 (Vstim) can have amplitudes higher than the maximum voltage the ASIC process can tolerate by cascading transistors. Therefore, using charge pump 115, the stimulus voltage can be higher (e.g. 6V) than the voltage level a single transistor can handle (e.g. 3.6 V). Although FIG. 1 shows charge pump 115 separate from transmit section 114, the charge pump can be part of the transmit section.

Touch sensor panel 124 can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some examples, the drive and sense lines can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces of other geometric configurations having first and second dimensions (e.g. the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as picture element (node) 126, which can be particularly useful when touch sensor panel 124 is viewed as capturing an "image" of touch. (In other words, after touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the nodes being touched, which is a function of Csig.

Computing system 100 can also include host processor 128 for receiving outputs from processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. In some examples, host processor 128 can be a separate component from touch controller 106, as shown. In other examples, host processor 128 can be included as part of touch controller 106. In still other examples, the functions of host processor 128 can be performed by processor subsystem 102 and/or distributed among other components of touch controller 106. Display device 130 together with touch sensor panel 124, when located partially or entirely under the touch sensor panel, can form touch screen 118.

Note that one or more of the functions described above can be performed, for example, by firmware stored in memory (e.g., one of the peripherals) and executed by processor subsystem 102, or stored in program storage 132 and executed by host processor 128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 2:
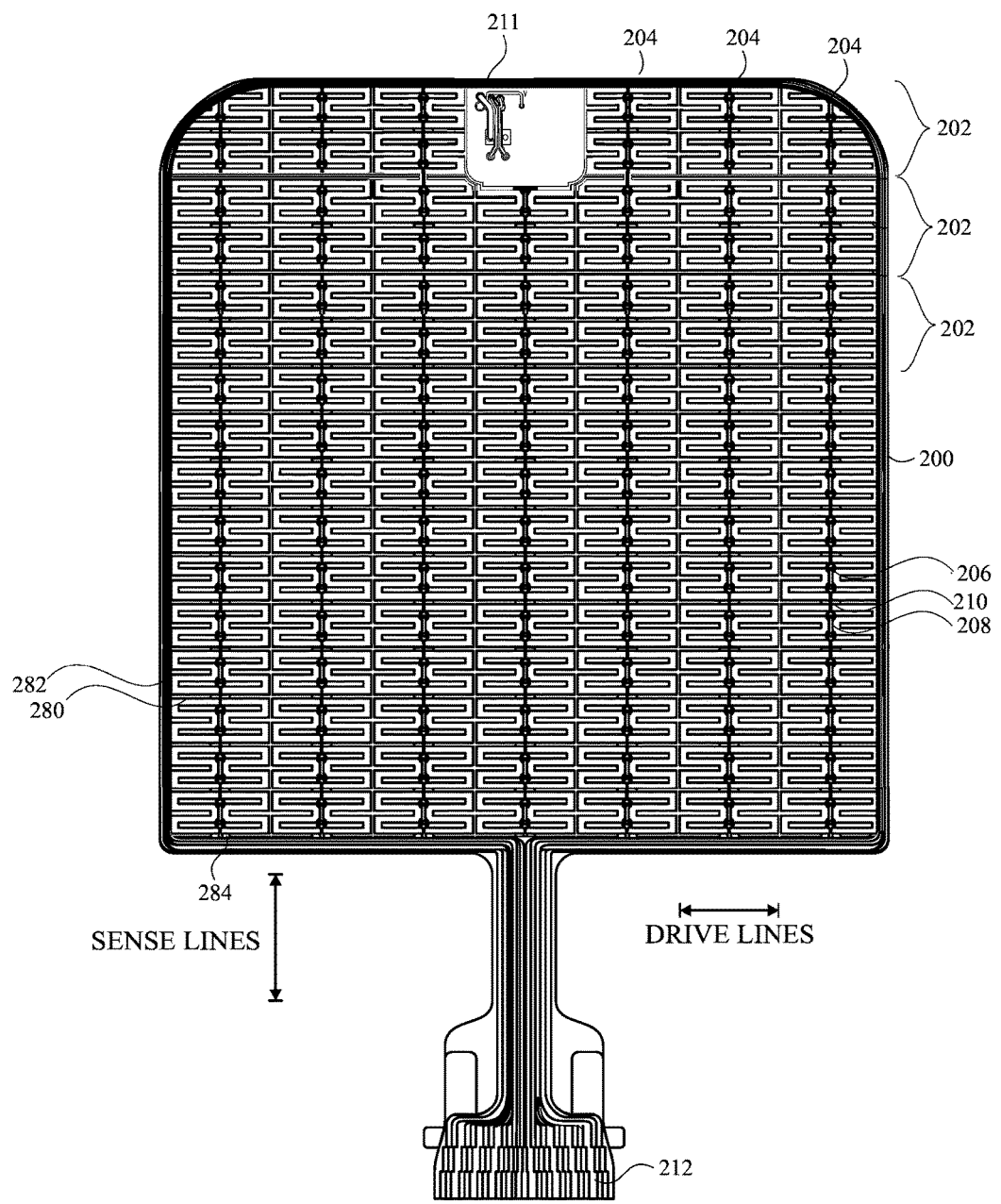
FIG. 2 illustrates an exemplary touch sensor panel that can be incorporated in the computing system 100 of FIG. 1, according to an example of the disclosure.

FIG. 2 illustrates an exemplary touch sensor panel 200 that can be incorporated in the computing system 100 of FIG. 1. In this example, the touch sensor panel 200 can be an SITO touch sensor panel having its drive lines 202 and sense lines 204 formed on the same layer in an interdigitated pattern. It should be understood that the touch sensor panel can have any other drive/sense line patterns suitable for a SITO panel. Other examples of SITO patterns can be found in, for example, Applicant's U.S. Pat. Nos. 8,593,410 and 8,633,915, the contents of which are incorporated in their entirety. The interdigitated drive lines 202 and sense lines 204 can span horizontally and vertically, respectively, across the touch sensor panel to form a matrix of touch nodes. For example, each square section of the interdigitated drive line 202 and sense line 204 can be a touch node. Because the drive lines 202 and sense lines 204 are on the same layer, each sense line 204 (or drive line in an alternative example) can include a number of sections 206, 208 interconnected by interconnects 210 to prevent the sense lines 204 from making direct electrical contact with the drive lines 202. Each interconnect 210 can connect two adjacent sense line sections 206, 208 either over or under a crossing drive line 202. In one example, each sense line can be "stitched" by passing the sense line through a via in the panel to the bottom surface (or a different layer) of the touch sensor panel 200 wherever it crosses a drive line and then back up to the top surface through another via after it has crossed over the drive line on the bottom surface. The sense lines 204 can be connected to a touch control 212 shown at the bottom of the panel 200. Touch signals (e.g., Csig) from one or more touch nodes along the sense lines 204 can be transmitted to the touch control 212 for processing to determine, for example, if one or more touches are detected on the panel 200 and the location of each of the detected touches.

As illustrated in FIG. 2, in this example, an SMT component 211 can mount in the center of the top row of the touch sensor panel 200. The SMT component 211 can be any internal component of the device such as a capacitor, resistor, processor etc. The SMT component can also be a module made up of multiple SMT components, for example, a camera module, light emitting diode (LED) module, etc. It should be understood that the SMT component 211 can be positioned anywhere on the touch sensor panel 200 and that the touch sensor panel can include more than one SMT component. Because the SMT component 211 occupies a particular area of the touch sensor panel 200, no drive or sense lines can be routed through that area. This can create a dead zone on the touch sensor panel, i.e., an absent touch node where no Csig can be detected.

Figure 3:
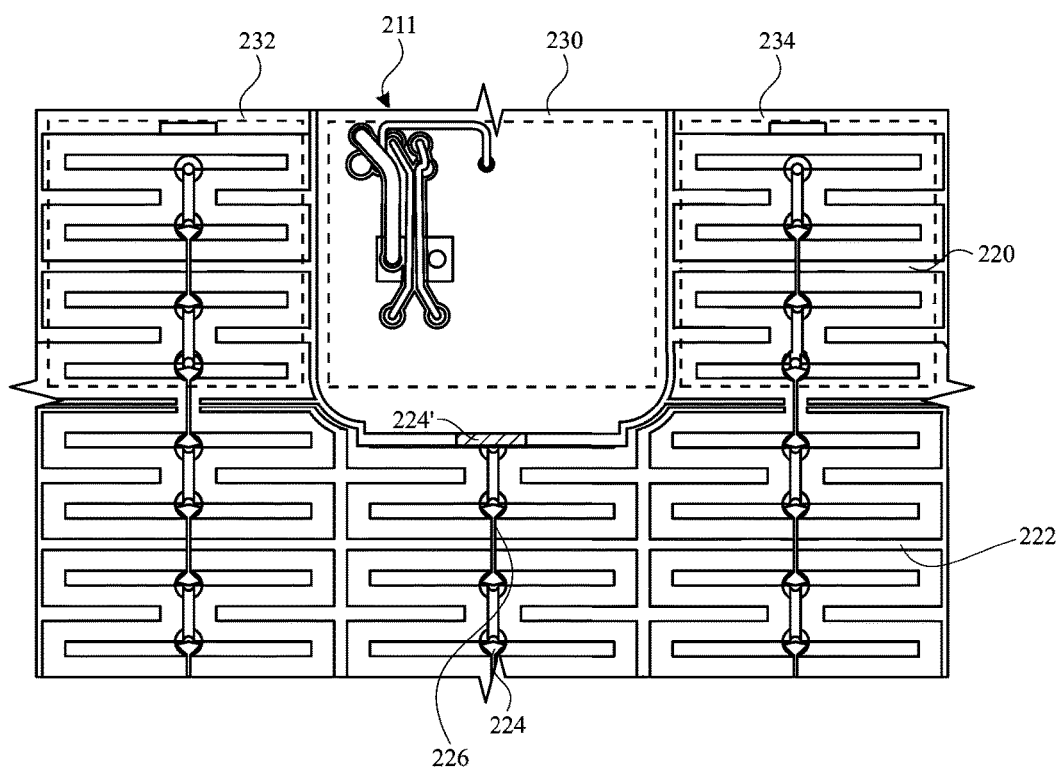
FIG. 3 illustrates a close-up view of the top center region of the touch sensor panel of FIG. 2, according to an example of the disclosure.

In one example of the disclosure, the drive and sense lines 202, 204 can be routed around the area occupied by the SMT component to recover at least part of the touch signal in the area. FIG. 3 illustrates a close-up view of the top center region of the touch sensor panel 200 of FIG. 2. In this example, to skirt around the SMT component 211, the bottommost row of drive line 220 and the topmost row of drive line 222 can be routed around the bottom half of the SMT component 211, traversing the touch node right below the SMT component 211. Unable to be routed through the area occupied by the SMT component 211, the sense line 224 can instead be routed through a via 226 in the touch sensor panel 200 to the bottom surface (or a lower layer) of the panel. The via 226 can be one of the vias that allows the sense line to cross over a drive line without making direct electrical contact with the drive line. The shaded area 224' in FIG. 3 represents the portion of the sense line 224 that is routed on the opposite (bottom) surface of the touch sensor panel 200. Essentially, the rerouted portions of drive lines 220, 222 and sense line 224' can be on the opposite surfaces of the panel, forming a DITO pattern in that region and creating a parallel plate capacitance between the portions of drive lines sense line 224'. The capacitive coupling between the drive line and the sense line of the DITO pattern can substitute for the missing Csig at the touch node 230 occupied by the SMT component 211.

In the example discussed above, while the rerouted drive lines and sense lines can provide a touch signal for the absent touch node 230, the touch signal detected by the DITO pattern in the proximity of the absent touch node 230 can be significantly weaker than those of the rest of the touch nodes because the overlap between the drive and sense lines in the DITO pattern can be much smaller than the overlap in the interdigitated SITO area. The weak touch signal associated with absent touch node 230 alone may not be sufficient to have an effect in determining the presence of a touch and the location of the touch on the touch sensor panel. Therefore the signal from touch node 230 may need to be gained up substantially, which may cause a high level of noise that can have a negative effect on the sensitivity of the touch sensor panel. The touch control of the device can also locate the absent touch nodes on the panel from the weak touch signals typically received from these nodes.

In one example, the weak touch signals detected from the absent touch node 230 can simply be ignored during processing. Instead, the touch controller can estimate a touch signal for the absent node 230 from touch signals associated with the adjacent touch nodes 232, 234. As an example, the average of the touch signal values of the touch nodes 232, 234 can be used for estimating the touch signal value of touch node 230. The touch signal value of each touch node including the estimated value for touch node 230 can form a touch image of the touch sensor panel.

It is preferable to have all touch nodes of a touch sensor panel have the same size and the same touch sensitivity to ensure that a touch location (and other touch data such as force and movement of the touch) can be accurately determined when a touch (or near touch) is detected anywhere on the panel. However, due to manufacturing tolerances and non-uniform routing of the drive and/or sense lines (e.g., as illustrated in FIG. 3), the touch sensitivities of the different touch nodes of the touch sensor panel can vary significantly. To correct the non-uniformities in touch sensitivity across the panel, gain compensation can be performed to optimize the performance of each touch node and the touch sensor panel as a whole. In one example, this can be achieved by calculating a per-node gain for every touch node of the touch sensor panel.

Figures 4A, 4B, 5:
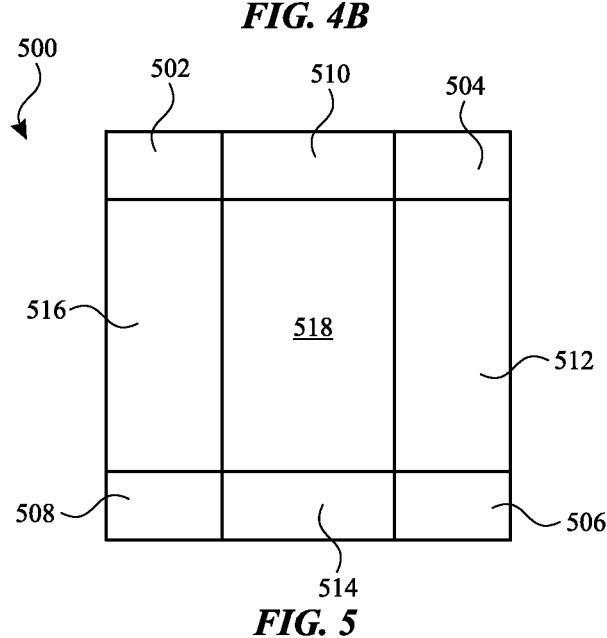
FIG. 4a illustrates an exemplary image of raw touch sensor output of all touch nodes of the touch sensor panel, according to an example of the disclosure.
FIG. 4b illustrates an exemplary image of final touch sensor output of all touch nodes of the touch sensor panel, according to an example of the disclosure.
FIG. 5 illustrates the exemplary regions of a touch sensor panel, accordingly to an example of the disclosure.

FIG. 4a illustrates an exemplary image of raw touch sensor outputs from the touch nodes of an exemplary 7×8 touch sensor panel. As illustrated in the "Raw Image" of FIG. 4a, the raw touch signal values can vary from touch node to touch node. As mention above, this can be due to manufacturing tolerances, the routing of the drive and sense lines, and/or other inherent properties of the touch sensor panel. It should be noted that, in some examples where there are one or more absent touch nodes (e.g., touch node 230 in FIG. 3), the raw value of these touch nodes can be estimated by, for example, using an average of the raw touch values from the adjacent touch nodes (e.g., touch nodes 232, 234 in FIG. 3), including, in some cases, the raw touch values from a DITO pattern (e.g., 224' in FIG. 3). In other examples, the raw touch values from the DITO pattern can be combined with an average of the raw touch values from the adjacent touch nodes.

A touch sensor panel with uniform sensitivity across all touch nodes can have the same touch signal value at all touch nodes, as illustrated in the "Final Image" of FIG. 4b. After the raw touch output value for each touch node is measured, a per-node gain for that touch node can be calculated by dividing the final value of the touch node by the raw value of the touch node. The per-node gains can be used for performing gain compensation when using the touch sensor panel to detect touch input. One of the advantages of calculating a per-node gain (or correction gain) for every touch node of the panel is that uniform touch sensitivity can be achieved regardless of the layout of the touch nodes of the touch sensor panel. That is, the disclosed method of implementing a correction gain for each touch node can work even for touch sensor panels with irregular shape (e.g., panels with rounded corners or missing touch nodes).

In other examples where the touch sensor panel has a regular shape (e.g., square or rectangular), the touch sensor panel can be divided into multiple regions, each including a number of touch pixels, and gain compensation can be performed on a per-region basis. In some cases, each region can include touch nodes which have similar raw touch output values (e.g., each touch node raw touch output value within the region can have a variance of less than 20%). For example, the touch sensor panel 500 illustrated in FIG. 5 can include four corner regions 502, 504, 506, 508, four edge regions (excluding the corners) 510, 512, 514, 516 and the center region (i.e., interior nodes) 518. Because the touch nodes in each region can have similar raw touch output values, the touch nodes in each region can have the same correction gain. The correction gain in different regions can be different.

Figure 6:
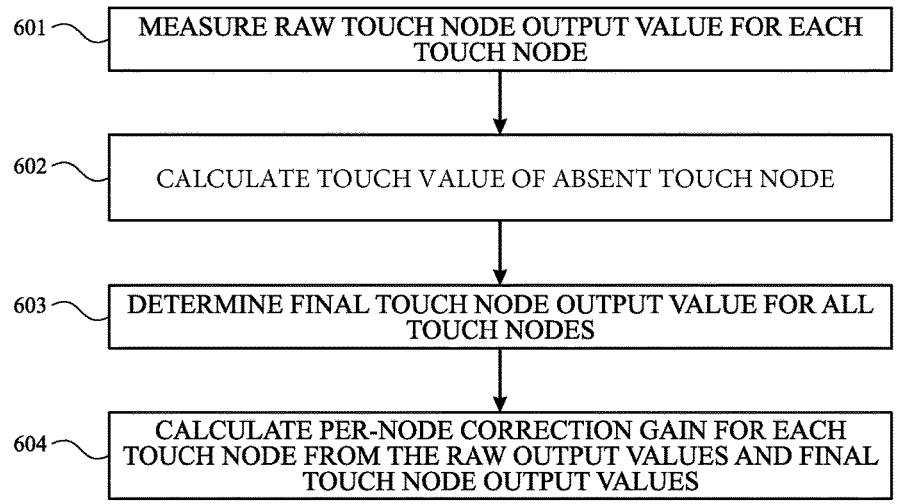
FIG. 6 is a flow chart illustrating the exemplary steps in implementing correction gains for the touch nodes of a touch sensor panel, according to an example of the disclosure.

FIG. 6 is a flow chart illustrating the exemplary steps in implementing correction gains for the touch nodes of a touch sensor panel, according to an example of the disclosure. First, the raw touch node output for each touch node can be measured (step 601). In a non-uniform touch panel (e.g., a touch panel with one or more absent touch nodes such as the one of FIG. 3), this can include reading a capacitance value from the DITO area of the touch sensor panel and use it as the raw touch value of the absent touch node 230 (e.g., a touch node occupied by an SMT). The touch control can then identify the absent touch nodes based on the raw touch node output captured from the touch panel. The touch value of the absent touch node can then be calculated or estimated (step 602) using, at least in part, the values from adjacent touch nodes. The touch output associated with the absent touch nodes can be much lower (e.g., 50% lower) than the rest of the touch nodes. In some examples, the actual touch value associated with the absent touch node (e.g., the touch value from the DITO area) can be ignored and replaced by interpolating the values from the adjacent touch nodes. In other examples, the touch output associated with the absent touch nodes can be combined with the interpolated values or included in the interpolation of values from adjacent touch nodes. A final touch node output value (e.g., 600 in FIG. 4b) universal for all touch nodes can be determined so as to provide uniform sensitivity all over the touch sensor panel (step 603). Finally, the per-node correction gain for each touch node can be calculated from the raw touch node output including the interpolated value of the absent touch node) and the final touch node output value of each touch node (step 604).

Figure 7:
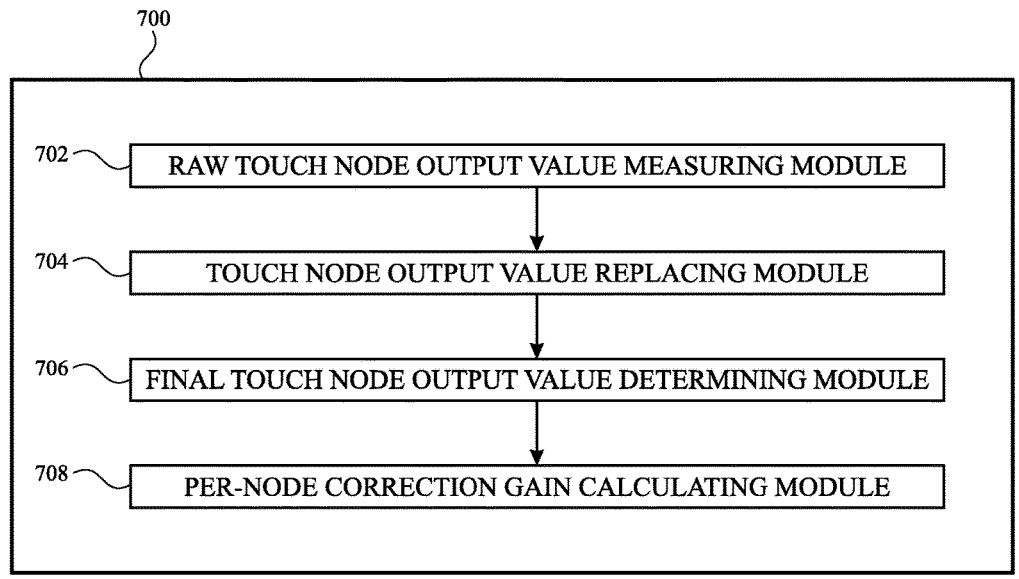
FIG. 7 is a block diagram illustrating the exemplary modules of a touch controller, according to an example of the disclosure.

FIG. 7 is a block diagram illustrating the exemplary modules of a touch controller 700, according to an example of the disclosure. The modules can include a raw touch node output value measuring module 702, a touch node output value replacing module 704, a final touch node output value determining module 706, and a per-node correction gain calculating module 708. The raw touch node output value measuring module 702 can measure the raw touch node output for each touch node of the touch sensor panel. The touch node output value replacing module 704 can replace the measured value of one or more absent touch nodes using the measured raw touch node output values of the adjacent touch nodes by, for example, averaging the raw touch node output values of the adjacent touch nodes. The final uniform touch node output value determining module 706 can determine the final uniform touch node output value for all touch nodes of the panel. In one example, the final uniform touch node output value can be set manually. The per-node correction gain calculating module 708 can calculate the per-node correction gain for each touch node from the raw touch node output value including the interpolated value for the absent touch node and the final touch node output value of each touch node. These exemplary modules of FIG. 7 can be implemented in firmware, software, and/or hardware in various examples of the disclosure.

Another aspect of the disclosure relates to the routing of the traces connecting the drive lines to the touch control of the touch sensor panel. Referring back to FIG. 2, each drive line 202 of the touch sensor panel 200 can be connected to the touch control 212 at the bottom of the figure via routing traces (not shown in FIG. 2).

Conventionally, these routing traces are routed along, for example, the side and bottom edges of the touch sensor panel on the same layer of the panel as the driving and sense lines. This can cause cross-coupling between the routing traces and sense lines, resulting in one or more false touches being detected by the touch control 212. More specifically, when a user's finger overlaps with, for example, a bottom left corner touch node of the touch sensor panel 200, it may cause a change to the Csig between the drive line 280 and sense line 284 of that particular touch node, reflecting a touch at the bottom left corner of the touch node, as it should. Because the routing trace connecting, for example, drive line 282 of the touch node above the corner touch node is routed in the same vicinity near the edge and the capacitance between drive line 282 and sense line 284 can be modulated as well due to the routing of drive signal, the touch node above the corner node can also reflect a touch, albeit a false one. This is an example of cross-coupling on a touch sensor panel, which can negatively affect the usability of the panel.

Figure 8:
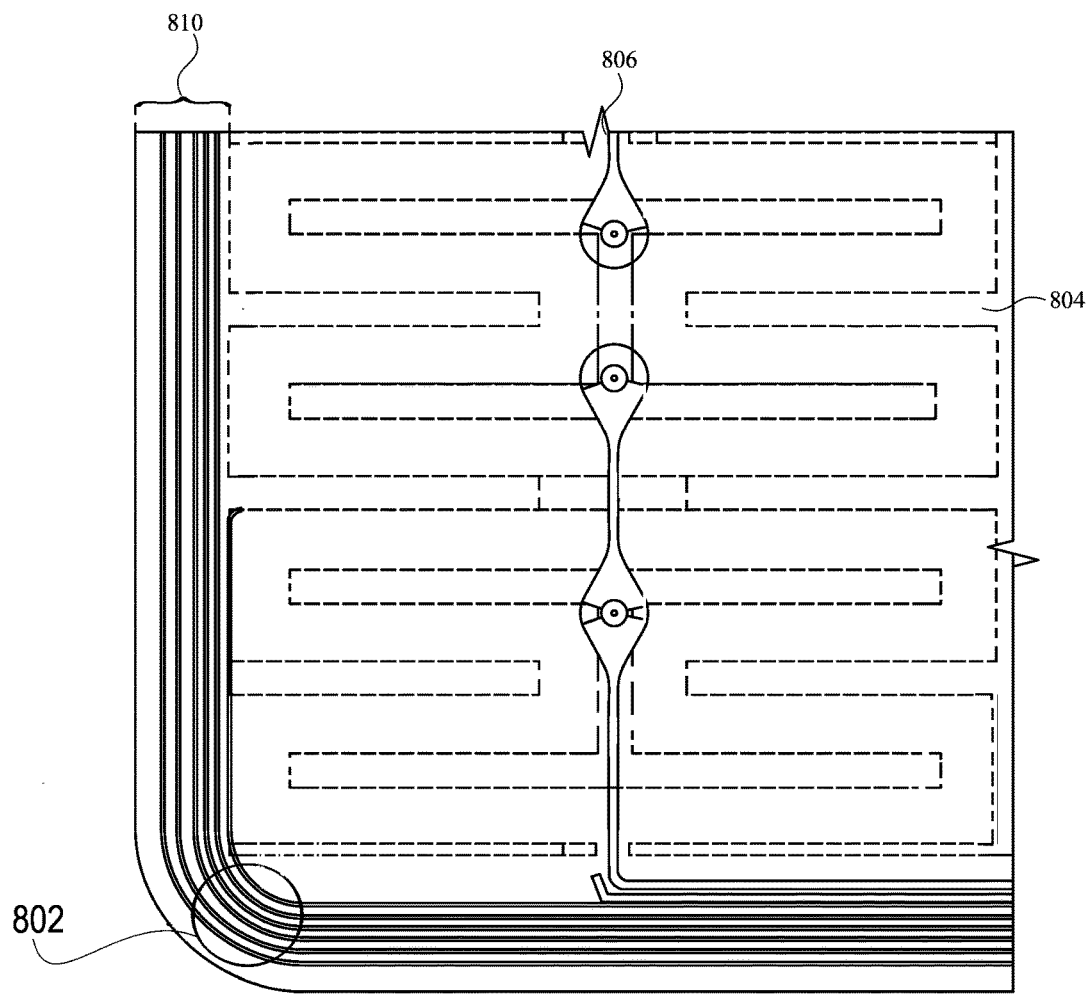
FIG. 8 illustrates a close-up view of the bottom left region of the touch sensor panel of FIG. 2, according to an example of the disclosure.

To reduce or eliminate cross-coupling, in one example of the disclosure, as illustrated in FIG. 8, the routing traces 802 connecting the drive lines 804 and the touch control (not shown in FIG. 8) can be routed on a different layer (or surface) of the touch sensor panel than the drive lines and sense lines. FIG. 8 provides an enlarged view of the lower left corner of the touch sensor panel of FIG. 2. In this example, the side wall of the touch sensor panel can be widened so that the routing traces 802 can be on a separate layer and shielded from the SITO layer of the drive lines 804 and sense lines 806. In this example, the routing traces 802 connecting drive lines can be routed underneath the top surface of the panel where the drive lines 804 and sense lines 806 can reside (shown in dotted lines as being on, for example, the opposite surface of the panel). The routing traces can pass through vias (not shown) in the touch sensor panel to reach the drive lines on the top surface. Because the drive lines 804 are driven by low-impedance buffer, they can essentially act as a ground plane, shielding the routing traces on the bottom surface from the sense lines on the top layer. As such, it can prevent cross-couplings between the routing traces and the sense lines. Another advantage of having the routing traces 802 on the bottom surface (or another layer) is that drive lines and sense lines can be formed closer to the edge area 810 due to the reduction in cross-coupling between the routing traces and drive lines and sense lines. This can allow touches to be detected closer to the edge of the touch sensor panel.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A touch sensor panel comprising:
   a substrate having a first surface and a second surface;
   a first touch node formed by a first drive line and a first section of a first sense line both routed on the first surface of the substrate; and
   a second touch node formed by a second drive line routed on the first surface of the substrate and a second section of the first sense line at a terminal end of the first sense line routed on the second surface of the substrate.

2. The touch sensor panel of claim 1, comprising:
   a via configured for routing the sense line from the first surface to the second surface.

3. The touch sensor panel of claim 1, comprising:
a surface-mounted (SMT) component mounted on the first surface of the substrate, wherein the second touch node is located adjacent to the SMT component.

4. The touch sensor panel of claim 1, comprising a second sense line routed entirely on the first surface of the substrate and forming touch nodes with the first and second drive lines.

5. The touch sensor panel of claim 4, wherein the second sense line and the first and second drive lines are routed in an interdigitated pattern.

6. The touch sensor panel of claim 1, comprising:
at least a plurality of routing traces each connecting one of the drive lines to a touch controller,
wherein the routing traces are routed on the second surface of the substrate.

7. The touch sensor panel of claim 6, wherein an end of each of the routing traces is connected to one of the drive lines on the first surface through a via in the substrate.

8. The touch sensor panel of claim 6, wherein the routing traces are electrically shielded from the first sense line.

* * * * *